Feb. 14, 1933.  C. H. SEAHOLM  1,897,655
TALKING MOTION PICTURE APPARATUS
Filed Nov. 8, 1929   2 Sheets-Sheet 1
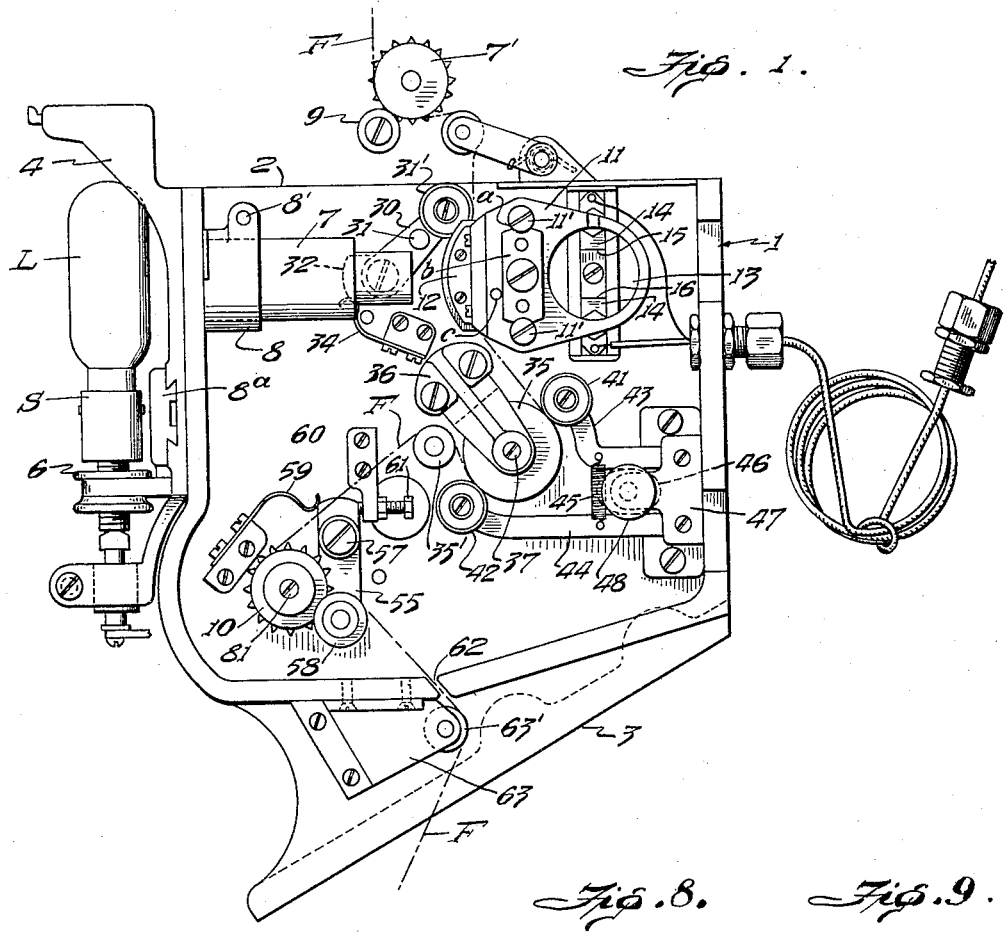
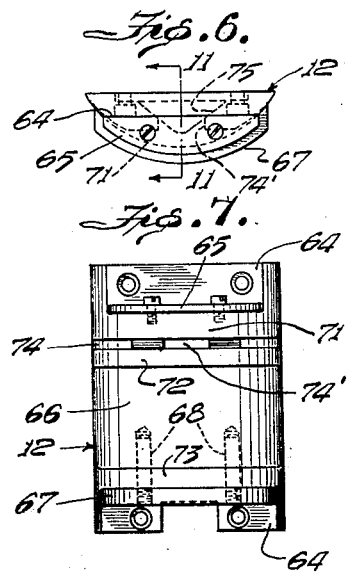
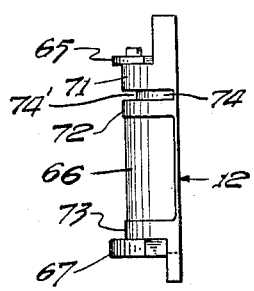
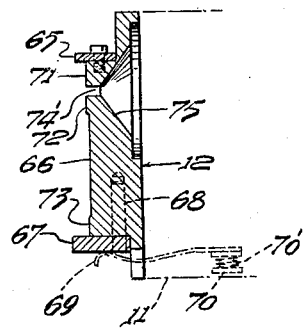
Inventor
Charles Hugo Seaholm
By David Pelton Moore
Attorney Feb. 14, 1933.  C. H. SEAHOLM  1,897,655
TALKING MOTION PICTURE APPARATUS
Filed Nov. 8, 1929   2 Sheets-Sheet 2
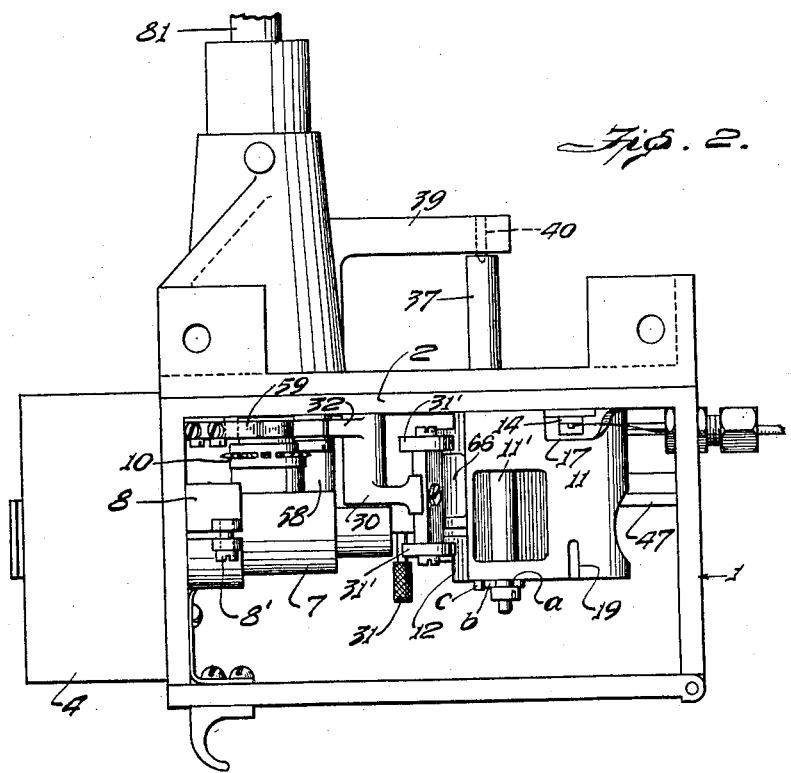
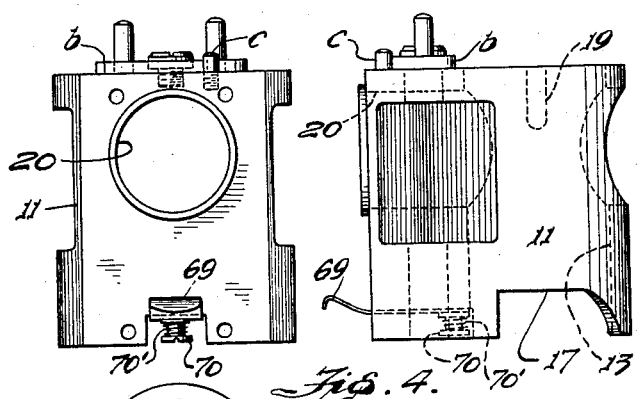
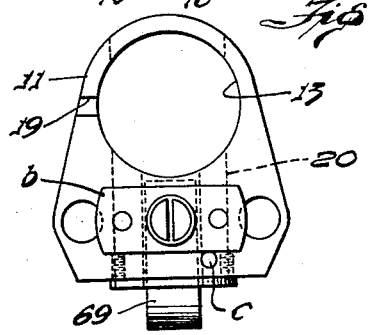
Inventor
Charles Hugo Seaholm
By David Pelton Moore
Attorney Patented Feb. 14, 1933

1,897,655

UNITED STATES PATENT OFFICE

CHARLES HUGO SEAHOLM, OF NEW YORK, N. Y., ASSIGNOR TO GENERAL TALKING PICTURES CORPORATION, OF NEW YORK, N. Y., A CORPORATION OF DELAWARE

TALKING MOTION PICTURE APPARATUS

Application filed November 8, 1929. Serial No. 405,743.

This invention relates in general to improvements in attachments for motion picture machines by means of which the added feature to produce so-called talking motion pictures is secured.

The general object of this invention is the provision of an improved device for moving the film continuously past a light source, light slit, and light sensitive cell in a smooth, continuous motion.

Another object of this invention involves apparatus of this type in which a number of mechanical features are employed which add to the ruggedness, smoothness of operation, ease in threading the film, ease in mounting and removing the exciter lamp, the photo electric cell, and other necessarily renewed parts.

Still another object of this invention is a novel mounting of the photo electric slit block carrying casing, that permits the easy and quick renewal and insertion of the casing, so that the same may be renewed and reinserted without undue loss of time and, therefore, in case the apparatus is being operated, no great shut down time results.

These and other objects, as will appear from the following disclosure, are secured by means of this invention.

This invention resides substantially in the combination, construction, arrangement, and relative location of parts, all as will be set forth in detail hereinafter, but such invention is not limited to such details as many changes may be made and will be within the scope of what is claimed.

In the drawings:—

Figure 1 is a side elevational view of the attachment with the lid removed showing the interior thereof, and the parts in normal position;

Fig. 2 is a top plan view of this arrangement;

Fig. 3 is a front view of the removable supporting casing for the slit block and the photo electric cell;

Fig. 4 is an end elevational view of this casing;

Fig. 5 is a side elevational view thereof;

Fig. 6 is an end view of the light slit block;

Fig. 7 is a face view of the light slit block;

Fig. 8 is an edge view of the light slit block, and

Fig. 9 is a section on line 11—11 of Fig. 6.

In the present practical embodiment of combined picture and sound projecting machines it is usual to maintain the picture projector and talking motion picture attachment, or what is known as the sound box, as two separate units mechanically connected together, the sound box unit being preferably located below the gear and lens box of the former. Naturally in such a device there are numerous sprocket wheels and rollers over which the film F passes and hence in threading up the machine it is necessary to make provision in the apparatus to permit of ease and rapidity in threading the machine without danger to the film. It is also desirable to provide a talking motion picture attachment for standard projection machines since in most cases the projection machine is already in operation and it is, therefore, highly desirable to be able to add as a unit the talking motion picture or sound box attachment. In this invention this object has been met in a highly successful manner with a rugged and relatively simple arrangement of parts.

A more detailed description of the invention with reference to the drawings will provide a better understanding of the invention. The casing supporting all of the parts of the attachment is shown at 1, and such casing is so shaped and designed as to rest upon and be attached to the base of the motion picture projector and have attached thereto and support the head of such projector. The upper edge indicated at 2 of this casing is made in such form or configuration so as to permit of the uniting of the attachment casing with the head of the picture projector. The edge indicated by the reference numeral 3 is of such configuration as to permit of attachment thereto of the base and lower reel magazine which receives the film indicated by the dotted line F.

At 4 is a casing secured to the casing 1 in which the two exciter lamps L are mounted in their sockets S. Each socket is controlled by means of the threaded rod or sleeve and nut 6 to permit of its fine adjustment vertically. By the use of the two sockets S mounted as indicated, the operator without any interruption to service can move slide 8a to move one lamp L out of alignment with the optical system 7, and bring the other into alignment, this being necessary when one lamp burns out. The burned out lamp can thus be removed and a new one substituted, all of this being possible while the machine is being operated. 5 is a pivoted mounting for the sockets. Forming part of or secured to the casing 4 is a round cylindrical projection 8 which is slotted and provided with ears and a screw 8′ so that optical system tube 7 may be adjustably secured therein. The lens system of any of the well-known types in this art are supported within the tube 7 and are adjustable or fixed with respect to each other as may be desirable to permit of focusing the light from one of the exciter lamps on the film at the point where the sound record is impressed.

There has been indicated in Fig. 1 a toothed sprocket wheel 7′ around a portion of which the film F passes and against which it is held by means of a small roller 9. This sprocket 7′ represents the lower feed sprocket of the head of the picture projector. A similar sprocket is shown within the casing 1 at 10 and is mounted on a shaft 81 (see Fig. 2). Shaft 81 is connected with the shaft on which roller 7′ is mounted by means of a plurality of gears of such size that the sprockets 7′ and 10 are driven in the desired direction and at the same speed. These gears are preferably driven by means of an electric motor, the gears and motor not being shown in the drawings.

After the film F leaves sprocket 7′ it is looped slightly, as shown, and then passes down under rollers 31′ which curves the film against the surface of the slit block, the detailed description of which will later appear. The rollers 31′ are mounted and carried on a pivoted lever 30 which has a projection 32 against which a flat spring 34 presses and thus holds the rollers resiliently or under tension toward the slit block. A knurled handle 31 is provided to release the rollers when threading the machine. The film after it leaves the slit block passes substantially fully around the relatively large roller 35 which is freely mounted on a shaft 37 journalled in a bracket 36, and thence over the small fixedly mounted roller 35′. By means of two small rollers 41 and 42 mounted on the ends of two pivotally supported arms or levers 43 and 44, respectively, the rollers 41 and 42 are urged towards the roller 35 by means of a spring 45 connected between the pivoted arms 43 and 44, said arms 43 and 44 are pivotally supported on a block 47, on the casing in such a manner that a rotatable cam 46 lies between them. The cam 46 is secured to a knurled knob 48 which is operated to open or permit the closing of the arms and to thereby move the rollers to and from the roller 35. It has been found in practise that the shaft which carries the sprocket 7′ is not always, nor is it made of sufficiently hard steel to wear smoothly and therefore that this sprocket often causes the jerky movement in the film which cannot be taken up by fly wheels or the like, but which in practise can be eliminated by the idler 93 over which the film is directed before being engaged by the upper rollers 31′. This idler 93 is supported from a lug 90, a portion of the casing 2 to which is pivoted an arm 91 which is held normally upwardly under tension by means of the spring 92 so that a slight tension is imparted to the idler 93 so that the film is held taut and any unevenness that may be imparted to the film by the sprocket 7′ is "ironed out" and the usual fly wheel can be dispensed with. This mechanism, together with the roller 35 imparts to the film the smooth steady motion it requires, and without the employment of fly wheels or other inertia devices.

The film F then passes around the sprocket wheel 10 and over a smooth roller 58 which holds the film against the sprocket wheel. The roller 58 is mounted on an arm 55 pivotally supported at 57, while a flat spring 59 holds the roller 58 towards sprocket 10. Mounted on a small bracket 60 is an adjustable thumb screw 61 which serves to limit the clockwise movement of the lever 55 under the action of a spring 59. The film F then passes through an opening 62 in the bottom of the casing over the idler 63′ of a block 63 and thence to the lower reel in the lower film magazine.

It may be pointed out here in connection with Fig. 2 that the roller 35 is mounted on shaft 37 in an anti-friction manner. The inner end of shaft 37 is journaled in a bracket 39 by means of the sharpened bearing pin 40. As will be apparent, the only force which drives the roller 35, and the shaft 37, is that caused by the film held against the toothless roller 35 by means of the rollers 41 and 42.

The slit block and photo electric cell supporting or housing member 11 is removably and detachably secured to casing 1 by means of two fixed posts 11′, as is clearly shown, and supports on its face the slit block unit 12. These posts, each are slotted at a to receive the finger operated double latch plate b pivoted to the member 11, and limited in its movement by the pin c. The hollow cylindrical part 13 of the supporting member 11 receives a photo electric cell 24, as will be described shortly. The cylindrical portion 13 is provided with a slot 19. It is likewise recessed at 17 so as to fit over the contacts support 14. When the parts are mounted in place, as shown in Fig. 1, the contacts 15 and 16 lie at the inner end of the part 13, as shown. A passage 20 extends through the supporting member 11 for the purpose to be described shortly.

The photo electric cell 24 of any of the well known types is shown within a cylindrical casing 21 which is notched at 22 to expose the cell. The casing 21 is closed at one end by means of a removable cylindrical block 25 on which is mounted contacts 26 and 27. The two wires from the cell 24 are threaded through a hole 29 and soldered to the contacts 26 and 27. The cylindrical casing 21 is provided with a bayonet pin 23. This whole unit provides what may be termed a cartridge. The parts are so arranged on this cartridge that when it is slipped into the cylindrical part 13 of member 11 so that the bayonet pin 23 passes into slit 19 the notch 22 coincides with the passage 20 and open toward the left (Figs. 1, 4 and 5) so that the photo electric cell 24 is exposed to light coming from the left towards the right.

Thus the light from the exciter lamp within casing 4 is focussed on the light slit, about to be described, passes through the film, through the light slit, through passage 20, past notch 22 to the photo electric cell 24. When the cartridge is slipped into the cylindrical part 13 contacts 26 and 27 are in engagement with the contacts 15 and 16, respectively, to complete circuits to the amplifier, as is well known in the art.

The slit block unit is shown more clearly in Figs. 6, 7, 8 and 9. It comprises a metal member of hardened, highly polished steel having straight and convex sides. The block is recessed at each end, as shown at 64. A plate 65 having a curved upper surface sets in one recess 64 and projects above the curved surface, as clearly shown in Figs. 6 and 8. This plate is securely held in place by means of screws. A similar plate 67 is provided in the other recess and is slidably mounted by means of two pins 68 fitting in sockets in the slit block. A flat spring 69 adjustably and slidably supported by the pin and slot connection 70, and the coiled spring 70', resiliently holds the plate 67 against the side of the recess. As clearly shown in Fig. 9 the actual curved surface of the block over which the film moves is provided with three raised ridges 71, 72 and 73 all of which lie in the same curved surface. The curved surfaces 74 and 66 are slightly below the curved surfaces 71, 72 and 73 and are concentric therewith. A light opening or slit 74' formed from the exterior of the slit block by a circular milling cutter provides the curved inclined portions 75, that provides with the slit a self cleaning slit block whereby any foreign matter entering the slot that forms the portions 75 and slit 74' is moved either side of the slit. Also this slot acts as a guide for any cleaning implement when the slit is clogged.

The plates 65 and 67 are spaced apart a distance equal to the normal width of the film. The film, therefore, moves around and over the ridges the curved surface of the slit block between these two plates and the parts are of the proportion that the picture portion of the film lies between the edges of the ridges 72 and 73 so as not to contact with the slit block and thus to prevent scratching and marring of the picture surface. In a similar manner the sound track on the film, which is a narrow longitudinal strip running along the side of the picture, lies between the ridges 71 and 72 out of contact with the slit block unit to eliminate marring and scratching thereof. Plate 67 is slidably mounted against the resiliency of the spring 69 so that it may move back and forth to allow the passage of the film therebetween notwithstanding its naturally irregularity of width due to numerous conditions, and said spring is so marked as to permit the easy and quick removal and insertion of the plate 67.

The film thus moves down over the slit block in contact with the ridges thereof between the light from the exciter lamp and the light slit. The lens system focusses the light on the sound track and the slit 74, which is of very closely the same width as the width of the sound track, serves to keep off any undesired light. The light of varying intensity passes onto the light sensitive cell where it is converted into varying electrical currents.

Although the members 11 and 12 are here shown as separate, it is possible that the same may be made integral, it being only essential that the contour of the member 12 be formed as described and illustrated with the proper slit opening therethrough so that the film is properly curved thereover in its guidance past the slit.

It will be seen from the foregoing disclosure that there has been devised an exceedingly efficient device for carrying out necessary functions incident to the production of sounds from photographic records.

What I claim is:—

1. A slit block of the type described comprising a body member having a curved surface, and three spaced ridges on said curved surface, the space between two of said ridges being approximately of the same width as the sound track on a film, and the space between two others of said raised portions being approximately the same width as the width of the picture on the film, said body member having a slit therethrough which lies in the space past which the sound track moves.

2. A film guide unit of the type described comprising a curved body member having thereon a plurality of raised portions and a plurality of depressed portions at least one of said depressed portions having a light orifice therethrough, a fixed end plate for said body member, a slidable end plate for said body member, and means for urging the slidable end plate towards the fixed end plate to hold therebetween the film passing over said curved body member.

3. A slit block of the type described comprising a body member having a curved surface, and three spaced raised portions on said curved surface, the space between one of said portions being approximately of the same width as the sound tract on a film and the space between the two other of said raised portions being approximately the same width as the width of the picture on the film, said body member having an opening therethrough which lies in the space past which the sound tract moves.

4. In a light slit member for use in apparatus of the type described, the combination comprising a curved body member having three spaced raised portions on the curved surface of the body member, a plate secured to one end of the body member, a second plate slidably supported at the other end of said body member, and a spring for resiliently urging the slidable plate towards the fixed plate, the distance between said plates being approximately the same as the width of the film, said raised portions all being of such size that the film moves thereover and in contact therewith.

5. In a light slit guide member for use in apparatus of the type described, the combination comprising a curved body member having three spaced raised portions on the curved surface of the body member, at least one of said raised portions lying at each end of said body member, a plate secured to one end of said body member at one of said raised portions, a second plate slidably secured at the other end of the body member at a second raised portion, spring means for resiliently urging the slidable plate towards the fixed plate so as to hold between said plates a film along its edges, said plates being so spaced that the distance therebetween is approximately the same as the width of the film and is adjustable by virtue of the slidable support to care for variation in film width.

6. The structure recited in claim 5 characterized in that the raised portions of the body member are all of such size that the film moves thereover and in contact therewith.

7. The structure recited in claim 5 characterized in that the raised portions are so spaced apart that the sound record passes over the space lying between one end raised portion and the middle raised portion while the picture record passes over the space lying between the middle raised portion and the raised portion allocated at the other end of the body member.

8. The structure recited in claim 5 characterized in that the raised portions are so spaced apart that the sound record passes over the space between one end raised portion of the middle raised portion, the curved surface between said raised portions having a light orifice therethrough which permits the light which has already passed through the sound record to pass through the slit block unit while the picture record already reproduced in a picture projection apparatus passes over that space which lies between the middle raised portion and the raised portion at the other end of the body member.

9. A slit block and film guide unit of the type described comprising a body member having a flat face and a convex face, a plurality of the raised portions mounted on said convex face and having a curvature concentric with the curvature of said face, said raised portions being so spaced apart that the distance between at least two of them is sufficient to permit the passage thereover of a film sound record while the distance between at least one of said two raised portions and another end portion is sufficient to permit the passage thereover of a film photographic record, and means adapted to securely hold the composite film at its edges despite variations in the width thereof.

10. In a film guide unit for use with a film having a sound tract thereon, a body member having a convex surface, said member having a surface groove on the convex side in the path of movement of the film sound tract and an aperture extending through the member and emerging on the convex surface thereof and within the groove.

11. Apparatus of the character described comprising a photo-electric cell, a fixed member enclosing the cell and forming a film support, said member having continuous curved guide portions adapted to be engaged by the marginal portions of a sound record film and having an intermediate depressed portion, said member having a light aperture therein arranged between the guide portions thereof.

12. Apparatus of the character described comprising a photo-electric cell, a cylindrical housing enclosing the cell and forming a film support, said housing having portions forming continuous guide surfaces adapted to be engaged by the marginal portions of a sound record film and having an intermediate depressed portion, said housing having a light aperture therein in the depressed portion and having a further depressed portion connecting with the aperture at the trailing side thereof.

13. A slit block including a fixed member having a curved film guiding face the surface of which is provided with a centrally depressed portion forming parallel film guiding ridges at opposite edges thereof.

14. A slit block as claimed in claim 13, in which a third ridge is formed adjacent to and parallel with one of said ridges, to provide a space over which the sound track of a sound record film is slid, there being an aperture formed through the body of the slit block between the last two ridges.

15. Apparatus of the character described, including a casing with a bore therein open at one end a photoelectric cell, a second casing for the cell removably mounted in said bore, said first casing having a light aperture therein and having portions at opposite sides of the aperture arranged to form continuous guide surfaces for a sound record film, and means for moving the film at a uniform speed over and in contact only with said guide surfaces.

In testimony whereof I affix my signature.

CHARLES HUGO SEAHOLM.